(12) United States Patent
Fukada et al.

(10) Patent No.: US 10,981,290 B2
(45) Date of Patent: Apr. 20, 2021

(54) WORKPIECE TRANSPORTATION SYSTEM AND WORKPIECE TRANSPORTATION METHOD

(71) Applicant: Murata Machinery, Ltd., Kyoto (JP)

(72) Inventors: Tatsugoro Fukada, Inuyama (JP); Daisuke Katsuyama, Inuyama (JP); Yoshio Hotta, Inuyama (JP)

(73) Assignee: Murata Machinery, Ltd., Kyoto (JP)

( * ) Notice: Subject to any disclaimer, the term of this patent is extended or adjusted under 35 U.S.C. 154(b) by 281 days.

(21) Appl. No.: 16/061,686

(22) PCT Filed: Nov. 11, 2016

(86) PCT No.: PCT/JP2016/083494
§ 371 (c)(1),
(2) Date: Jun. 13, 2018

(87) PCT Pub. No.: WO2017/104322
PCT Pub. Date: Jun. 22, 2017

(65) Prior Publication Data
US 2018/0370058 A1 Dec. 27, 2018

(30) Foreign Application Priority Data
Dec. 18, 2015 (JP) .............................. JP2015-247091

(51) Int. Cl.
*B23K 26/10* (2006.01)
*B26D 7/18* (2006.01)
(Continued)

(52) U.S. Cl.
CPC ........ *B26D 7/1863* (2013.01); *B23K 26/0869* (2013.01); *B23K 26/10* (2013.01);
(Continued)

(58) Field of Classification Search
CPC .. B26D 7/18; B23K 26/38; B66C 1/02; B21D 28/02–10
See application file for complete search history.

(56) References Cited

U.S. PATENT DOCUMENTS 2,451,226 A * 10/1948 Kemp, Jr. .......... B65D 19/0034
414/349
2,509,682 A * 5/1950 Golrick ..................... B66F 9/12
108/52.1
(Continued)

FOREIGN PATENT DOCUMENTS

CN 204367075 U 6/2015
JP S62-195143 A 8/1987
(Continued)

OTHER PUBLICATIONS

Notice of Reasons for Refusal dated May 28, 2019, of counterpart Japanese Application No. 2017-556422, along with an English translation.
(Continued)

*Primary Examiner* — Lee D Wilson
*Assistant Examiner* — Mahdi H Nejad
(74) *Attorney, Agent, or Firm* — DLA Piper LLP (US)

(57) ABSTRACT

A workpiece transportation system includes a machining palette that is able to move while holding a cut workpiece including a product and the remainder; a supporter that receives the workpiece from the machining palette and supports the workpiece; a suction attacher disposed on the supporter and attaches by suction to at least the product in the workpiece supported by the supporter; and a gripper that separates the remainder from the product attached to by suction by the suction attacher.

9 Claims, 12 Drawing Sheets

(51) Int. Cl.
  *B23K 26/08* (2014.01)
  *B23K 37/00* (2006.01)
  *B23K 26/70* (2014.01)
  *B23K 37/04* (2006.01)
  *B23K 101/18* (2006.01)
  *B65G 47/91* (2006.01)

(52) U.S. Cl.
  CPC ............ *B23K 26/702* (2015.10); *B23K 37/00* (2013.01); *B23K 37/0408* (2013.01); *B26D 7/18* (2013.01); *B23K 2101/18* (2018.08); *B65G 47/912* (2013.01)

(56) References Cited

U.S. PATENT DOCUMENTS

| | | | | |
|---|---|---|---|---|
| 6,346,682 | B2* | 2/2002 | Kim | B65G 47/911 |
| | | | | 209/573 |
| 8,141,922 | B2* | 3/2012 | Shim | H01L 21/6838 |
| | | | | 294/87.1 |
| 8,492,677 | B2* | 7/2013 | Caristan | B23K 26/0838 |
| | | | | 219/121.72 |
| 9,156,179 | B2* | 10/2015 | Bauch | B21D 28/10 |
| 10,583,568 | B2* | 3/2020 | Tanahashi | B65G 47/91 |
| 2004/0202531 | A1* | 10/2004 | Beransky | B23K 37/0408 |
| | | | | 414/331.18 |
| 2005/0135913 | A1* | 6/2005 | Visser | A01G 9/088 |
| | | | | 414/623 |
| 2008/0023900 | A1* | 1/2008 | Sohka | B23Q 7/04 |
| | | | | 269/73 |
| 2009/0127762 | A1 | 5/2009 | Kilian | |
| 2013/0167350 | A1* | 7/2013 | Kokubo | B29C 43/36 |
| | | | | 29/426.5 |
| 2013/0291593 | A1* | 11/2013 | Roh | C03B 33/03 |
| | | | | 65/29.12 |
| 2014/0033852 | A1* | 2/2014 | Chen | B65G 49/061 |
| | | | | 74/490.05 |
| 2016/0256956 | A1* | 9/2016 | Nagae | B23K 26/083 |
| 2017/0313562 | A1* | 11/2017 | Schalk | B66F 9/12 |
| 2018/0208422 | A1* | 7/2018 | Gallucci | B65G 60/00 |
| 2020/0109016 | A1* | 4/2020 | Zaffaroni | B21D 43/003 |
| 2020/0270075 | A1* | 8/2020 | Yamazaki | B23Q 7/04 |

FOREIGN PATENT DOCUMENTS

| | | |
|---|---|---|
| JP | 2001-105182 A | 4/2001 |
| JP | 2011-018730 A | 1/2011 |
| JP | 2013-86142 A | 5/2013 |
| JP | 2013-184805 A | 9/2013 |
| JP | 2015-104793 A | 6/2015 |
| JP | 2015-223608 A | 12/2015 |
| WO | WO2013159388 A1 * | 10/2013 |
| WO | 2014/077059 A1 | 5/2014 |

OTHER PUBLICATIONS

Office Action dated May 29, 2019, of counterpart Chinese Application No. 201680072031.5, along with an English translation.

* cited by examiner (A)

(B)

(A)

(B)

WORKPIECE TRANSPORTATION SYSTEM AND WORKPIECE TRANSPORTATION METHOD

TECHNICAL FIELD

This disclosure relates to a workpiece transportation system and workpiece transportation method.

BACKGROUND

There are known technologies by which products are cut out of a workpiece such as a plate material. For example, products are obtained by cutting a workpiece into products and the remainder using various machines such as a laser cutting machine, then separating the remainder and the products, and performing other steps. Examples of proposed technologies that separate products and the remainder include a product separator in Japanese Unexamined Patent Application Publication No. 2013-184805 and a thermal cutting system in International Publication No. 2014/077059.

The product separator of JP '805 separates the remainder from products in a workpiece by lifting the remainder from the workpiece using a skeleton separation unit, places the lifted remainder on a skeleton vehicle, and transports the remainder. The thermal cutting system of WO '059 cuts a workpiece placed on a workpiece support table, lifts the cut workpiece from the workpiece support table using a workpiece lifting apparatus, and then picks up products from the workpiece.

When products and the remainder are separated using the above conventional technologies, the products may move due to, for example, catching of the product on the remainder. For example, when an attempt is made to pick up products accompanied by the remainder, the remainder may catch on one product and interfere with other products, thereby misaligning the products and making efficient pick-up (collection) of the products difficult.

It could therefore be helpful to make it possible to satisfactorily separate a product and the remainder.

SUMMARY

We thus provide:

A workpiece transportation method includes a machining palette able to move while holding a cut workpiece including a product and the remainder, a supporter that receives the workpiece from the machining palette and supports the workpiece, a suction attacher disposed on the supporter and attaches by suction to at least the product in the workpiece supported by the supporter, and a gripper that separates the remainder from the product attached to by suction by the suction attacher.

A workpiece transportation system includes moving, by a machining palette, while holding a cut workpiece including a product and the remainder, receiving, by a supporter, the workpiece from the machining palette and supporting the workpiece, attaching by suction, by a suction attacher disposed on the support, to at least the product in the workpiece supported by the supporter, and separating the remainder from the product attached to by the suction attacher.

The supporter may move upward relative to the machining palette and receive the workpiece from the machining palette. The machining palette may include multiple support plates extending in a predetermined direction parallel with a lower surface of the workpiece. The support plates may support the lower surface of the workpiece, and the supporter may include multiple arms inserted between the support plates and support the lower surface of the workpiece. The arms of the supporter may be moved relative to the support plates of the machining palette in the predetermined direction and inserted between adjacent two support plates of the support plates of the machining palette. The arms of the supporter may be located under the support plates of the machining palette, moved vertically relative to the support plates, and inserted between the support plates. The suction attacher may be disposed on surfaces facing the workpiece, of the arms. When the workpiece is passed from the machining palette to the supporter, the suction attacher may attach to at least the product in the workpiece. The gripper may remove the remainder from the product by moving upward while gripping the remainder. The machine may cut the workpiece by applying a laser light to a yet-to-be-machined workpiece placed on the machining palette. The workpiece transportation system may include a product unloader that transfers, from the supporter, the product separated from the remainder by the gripper.

The workpiece is passed from the machining palette to the supporter, and the remainder is separated in a state in which the product is attached to by the suction attacher of the supporter. Thus, the product and the remainder can be satisfactorily separated. Therefore, for example, interference between the product and the remainder to cause misalignment can be suppressed, and the product can be efficiently collected.

If the supporter moves upward relative to the machining palette and receives the workpiece from the machining palette, the supporter receives the workpiece while supporting the lower surface of the workpiece on the machining palette. Thus, the supporter is able to support the workpiece stably, and the remainder can be removed from the stably supported workpiece. If the machining palette includes multiple support plates extending in a predetermined direction parallel with a lower surface of the workpiece; the support plates support the lower surface of the workpiece; and the supporter includes multiple arms inserted between the support plates and support the lower surface of the workpiece, the workpiece is supported by the arms. Thus, the workpiece can be supported stably, and the remainder can be removed from the stably supported workpiece. If the arms of the supporter are moved relative to the support plates of the machining palette in the predetermined direction and inserted between adjacent two support plates of the support plates of the machining palette, the arms are moved in the predetermined direction parallel with the support plates and inserted between the support plates. Thus, the workpiece can be supported stably while avoiding the interference between the support plates and the arms. If the arms of the supporter are located under the support plates of the machining palette, moved vertically relative to the support plates, and inserted between the support plates, the arms of the supporter are located under the support plates. Thus, the size of the apparatus can be made compact. If the suction attacher is disposed on surfaces facing the workpiece, of the arms, the suction attacher is able to firmly attach to the product and thus the product and the remainder can be separated reliably. If the suction attacher attaches to at least the product in the workpiece when the workpiece is passed from the machining palette to the supporter, the supporter is able to firmly support the workpiece using the suction attacher and thus the workpiece can be reliably separated from the machining palette. If the gripper removes the remainder from the product by moving upward while gripping the remainder, the gripper lifts the remainder while firmly gripping it. Thus, the product and the remainder can be reliably separated. If the machine cuts the workpiece by applying laser light to a yet-to-be-machined workpiece placed on the machining palette, the workpiece can be cut quickly, increasing productivity. If the workpiece is cut using laser light, the workpiece is typically cut with a small cutting width, and the gap between the product and the remainder is narrow. However, the product and the remainder can be satisfactorily separated as described above and thus both an increase in productivity and favorable separation between the product and the remainder can be achieved. If the workpiece transportation system includes a product unloader that transfers from the supporter, the product separated from the remainder by the gripper, the product separated from the remainder can be efficiently transferred, increasing productivity.

Figure 1:
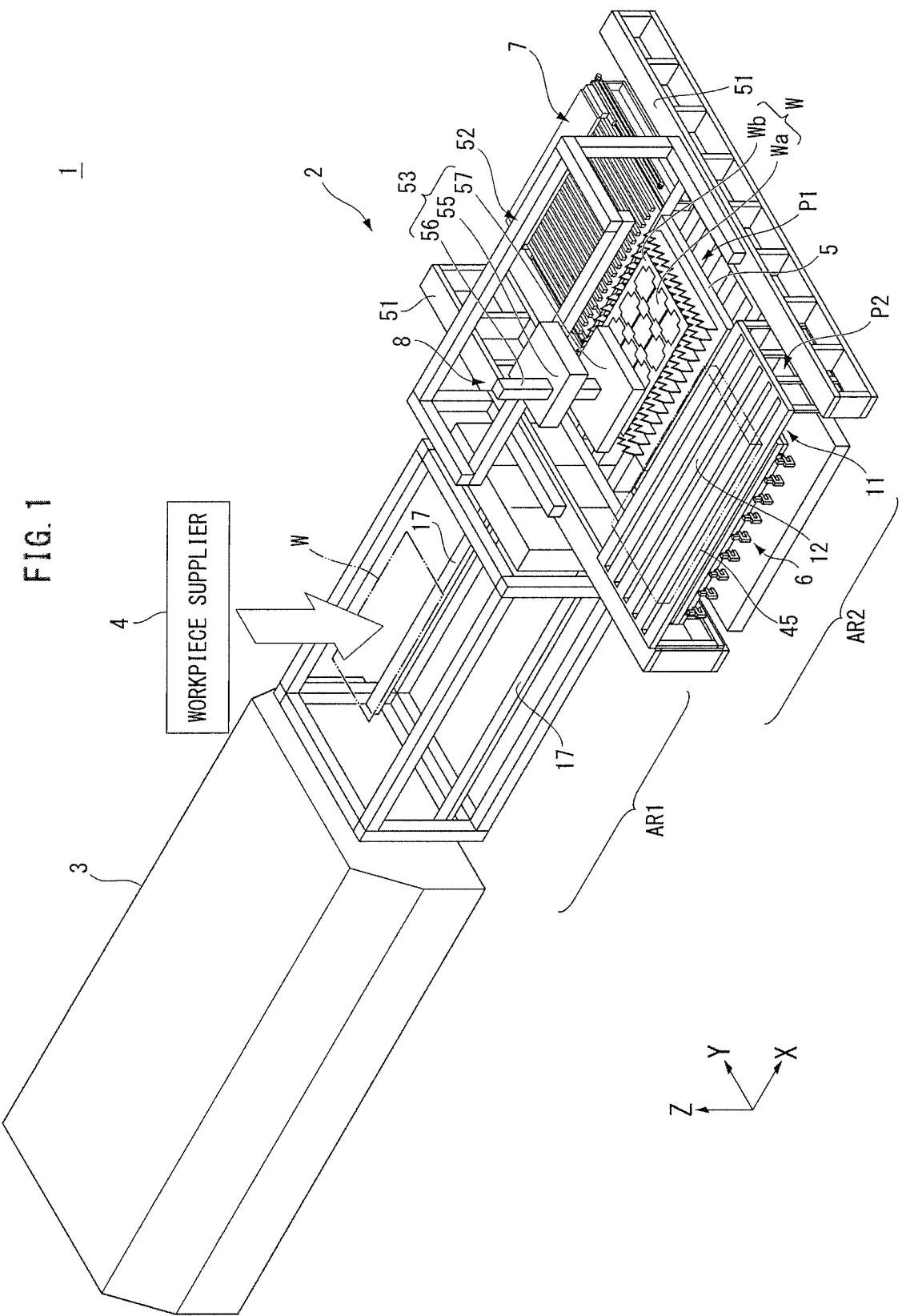
FIG. 1 is a conceptual drawing showing an example of a machining system that uses a workpiece transportation system according to a first example.

DESCRIPTION OF REFERENCE SIGNS 1 machining system
2 workpiece transportation system
3 laser machine (machine)
5 machining palette
6 gripper
7 fork apparatus (supporter)
8 product unloader
W workpiece
Wa product
Wb remainder

DETAILED DESCRIPTION

Examples of our systems and methods will be described with reference to the drawings. In the drawings, directions are shown by an XYZ coordinate system. The vertical direction in the XYZ coordinate system is defined as a Z-direction, and the horizontal directions are defined as an X-direction and a Y-direction. Sides represented by the arrows of the X-, Y-, and Z-directions are referred to as positive sides (e.g., the positive X-side), and sides opposite thereto are referred to as negative sides (e.g., the negative X-side).

FIRST EXAMPLE

FIG. 1 is a conceptual drawing showing an example of a machining system that uses a workpiece transportation system. Machining system 1 cuts workpieces. Hereafter, the machining system 1 will be described as being a laser machining system that cuts workpieces by laser machining. The machining system 1 includes a workpiece transportation system 2, a laser machine 3, and a workpiece supplier 4.

First, the machining system 1 will be outlined. The workpiece transportation system 2 includes a machining palette 5, a gripper 6, a fork apparatus 7 (supporter), a product unloader 8, and a product palette 11. The machining palette 5 is able to move while holding a workpiece W. The workpiece supplier 4 supplies a yet-to-be-machined workpiece W to the machining palette 5 in a loading area AR1. The workpiece transportation system 2 transports the machining palette 5 holding the yet-to-be-machined workpiece W to the laser machine 3. The laser machine 3 laser-machines the workpiece W on the machining palette 5. The workpiece W is cut into products Wa (see a workpiece W in a right portion of FIG. 1) and the remainder by laser machining.

Figure 4:
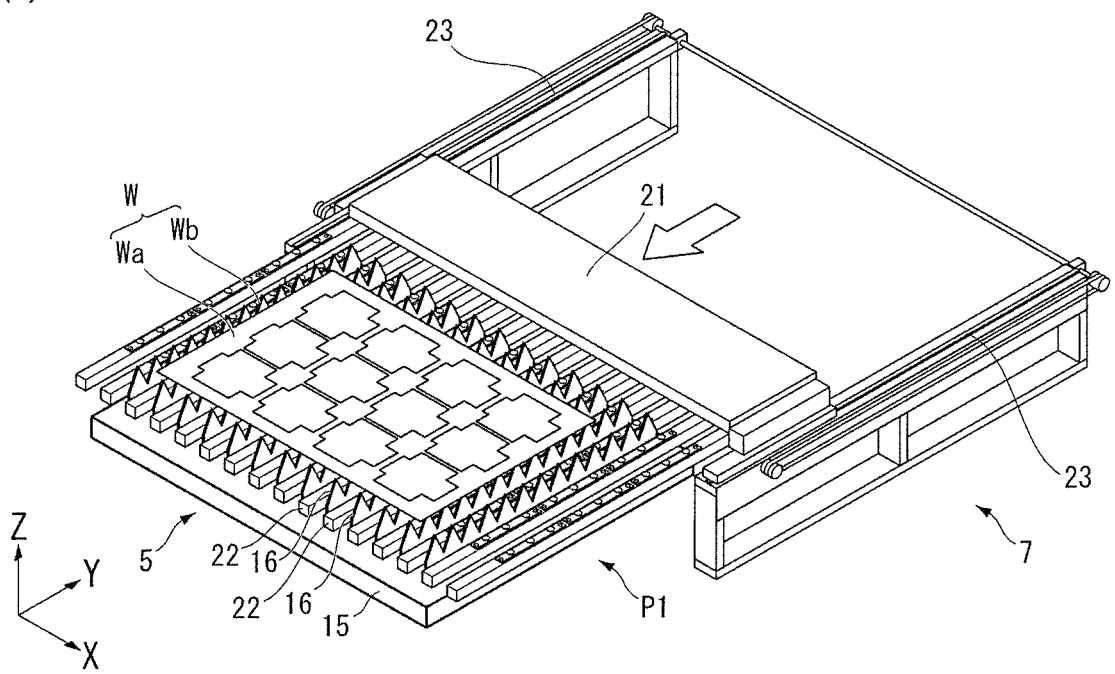
FIGS. 4A and 4B are perspective views showing operation of the supporter according to the first example.
Figure 4:
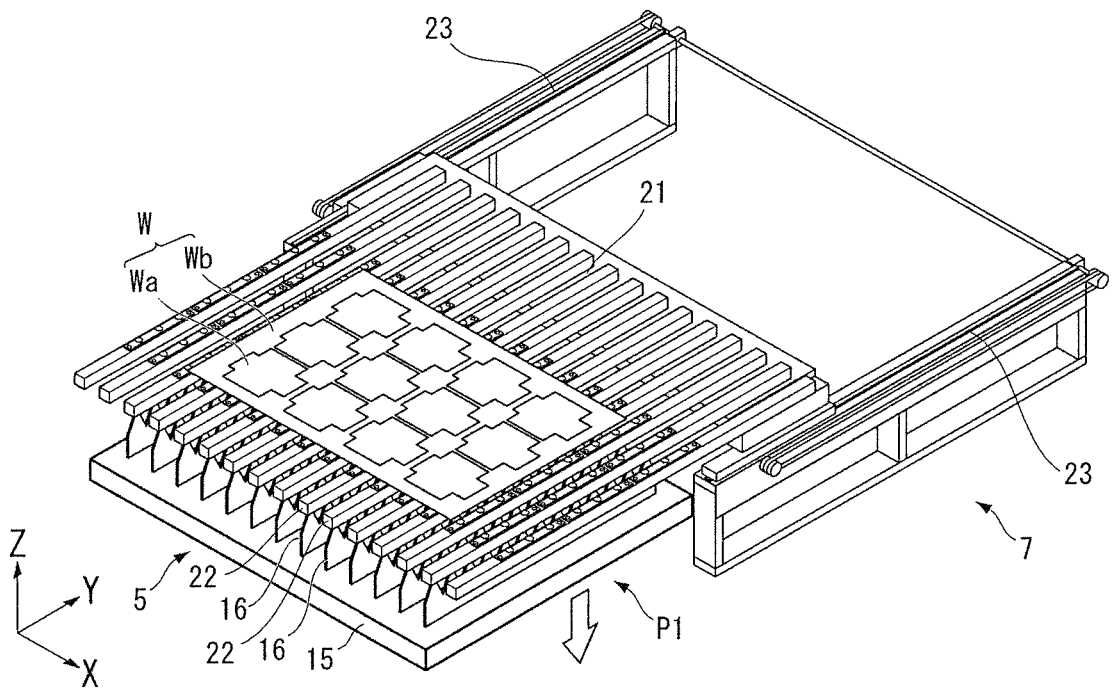

The workpiece transportation system 2 transports the machining palette 5 holding the machined workpiece W from the laser machine 3 to an unloading area AR2. Installed in the unloading area AR2 are the gripper 6, the fork apparatus 7, the product unloader 8, and the product palette 11. The fork apparatus 7 (also shown in FIG. 4) receives the machined workpiece W from the machining palette 5 and supports it. The fork apparatus 7 is provided with suction attachers 10 (shown in FIG. 5 and the like) that attach by suction to products Wa. The gripper 6 removes the remainder Wb from the machined workpiece W held by the fork apparatus 7 in a state in which the products Wa are attached by suction. The product unloader 8 transfers the products Wa held by the fork apparatus 7 to the product placement unit 12. The products Wa are collected on the product placement unit 12 of the product palette 11 and then transported to the outside. The elements of the machining system 1 will be described below.

The workpiece supplier 4 is a workpiece storage unit, raw-material storage unit or the like and is installed in the loading area AR1. The loading area AR1 is located adjacent to the workpiece unloading exit of the laser machine 3. In this example, the workpiece unloading exit is formed on the positive X-side of the laser machine 3, and the loading area AR1 is located on the positive X-side of the laser machine 3. For example, the workpiece supplier 4 attaches by suction to one of multiple yet-to-be-cut workpieces W accumulated in a stockhouse using a pad, lowers the workpiece W from above the machining palette 5, and places the workpiece W on the machining palette 5. The configuration of the workpiece supplier 4 need not be that described above and may be changed as needed. The workpiece supplier 4 may be incorporated in the workpiece transportation system 2 or may be an apparatus (e.g., factory facility) outside the machining system 1.

Figure 2:
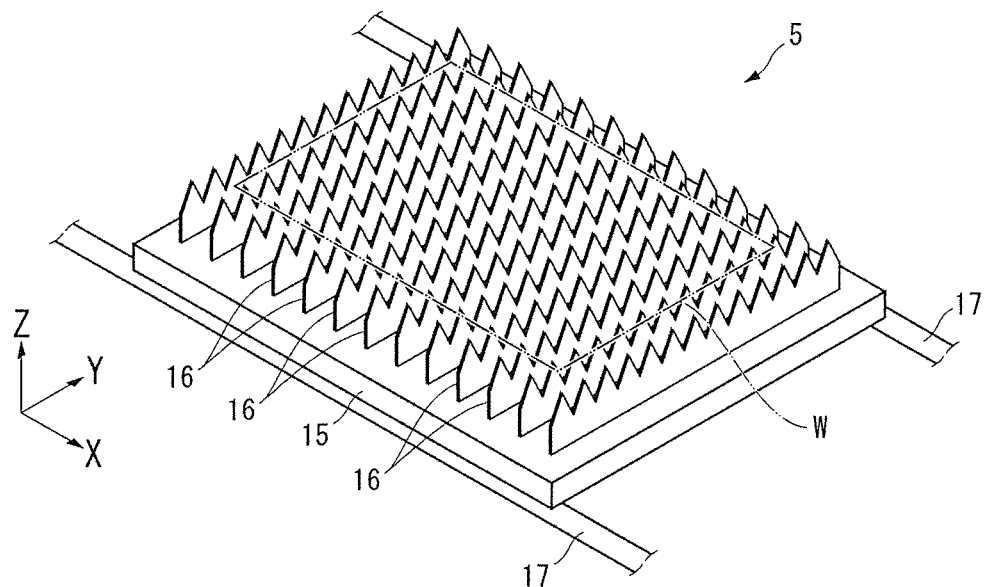
FIGS. 2A and 2B are perspective views showing a machining palette according to the first example.
Figure 2:
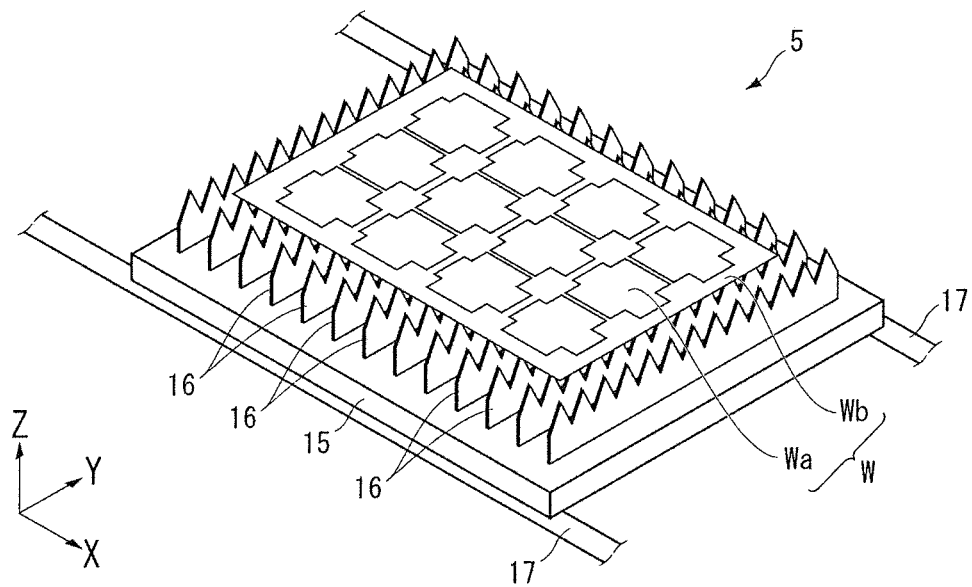

FIGS. 2A and 2B include perspective views showing the machining palette according to this example. The machining palette 5 includes a base plate 15 and multiple support plates 16. The support plates 16 have tabular shapes and are disposed approximately perpendicular to the upper surface of the base plate 15. The support plates 16 extend in a predetermined direction (e.g., Y-direction) parallel with the lower surface of the workpiece W and are arranged in the X-direction at predetermined intervals. The support plates 16 have sawtooth upper edges and support the lower surface of the workpiece W at multiple points (sawtooth edges).

For example, the machining palette 5 includes wheels (not shown) that are able to move along rails 17. The rails 17 linearly extend from the laser machine 3 (see FIG. 1) to the unloading area AR2. The workpiece transportation system 2 transports the machining palette 5 along the rail 17 by towing the machining palette 5. For example, a hook connected to a wire is fastened to the machining palette 5, and the machining palette 5 is towed by winding the wire around a driver. The mechanism to move the machining palette 5 may be changed as needed. For example, the machining palette 5 may be self-propelled.

The laser machine 3 laser-machines (cuts) a yet-to-be-machined workpiece W placed on the machining palette 5 by applying laser light to the workpiece W. The laser machine 3 includes a laser head and a head driver. The laser head is connected to a laser light source through a light transmitter such as an optical fiber, and emits laser light downward. The laser light source is, for example, a solid laser light source such as a fiber laser and provides laser light having higher thermal density than a carbon dioxide laser or the like. For this reason, the laser machine 3 using a fiber laser is able to cut a workpiece quickly. Welds may be made between the workpiece W and the support plates 16 of the machining palette 5 by laser machining. However, the welds between the support plates 16 and the workpiece W can be reduced since the support plates 16 support the workpiece W at multiple points.

As shown in FIG. 2B, the workpiece W is cut into multiple products Wa and the remainder Wb (skeleton, the peripheries of the products Wa) by laser machining. The machining palette 5 is able to move while holding the cut (laser-machined) workpiece W including the products Wa and the remainder Wb. The machining system 1 may use a machine such as a punch press that cuts a workpiece W using a cutting blade in place of the laser machine 3, or may use both the laser machine 3 and a punch press.

Referring back to FIG. 1, the workpiece transportation system 2 transports the machining palette 5 holding the machined workpiece W to the unloading position P1 of the unloading area AR2 along the rails 17. The positional relationship between the laser machine 3, the loading area AR1, and the unloading area AR2 shown in FIG. 1 is illustrative only and can be changed arbitrarily. For example, the rails 17 are linearly disposed in parallel with the X-direction, and the unloading position P1 is a predetermined position on the rails 17. The gripper 6 is able to move between the unloading position P1 and a retreat position P2. In FIG. 1, the retreat position P2 is set on the negative Y-side with respect to the unloading position P1. For example, the fork apparatus 7 (also shown in FIG. 3) is disposed on the opposite side (positive Y-side) of the retreat position P2 with respect to the unloading position P1.

Figure 3:
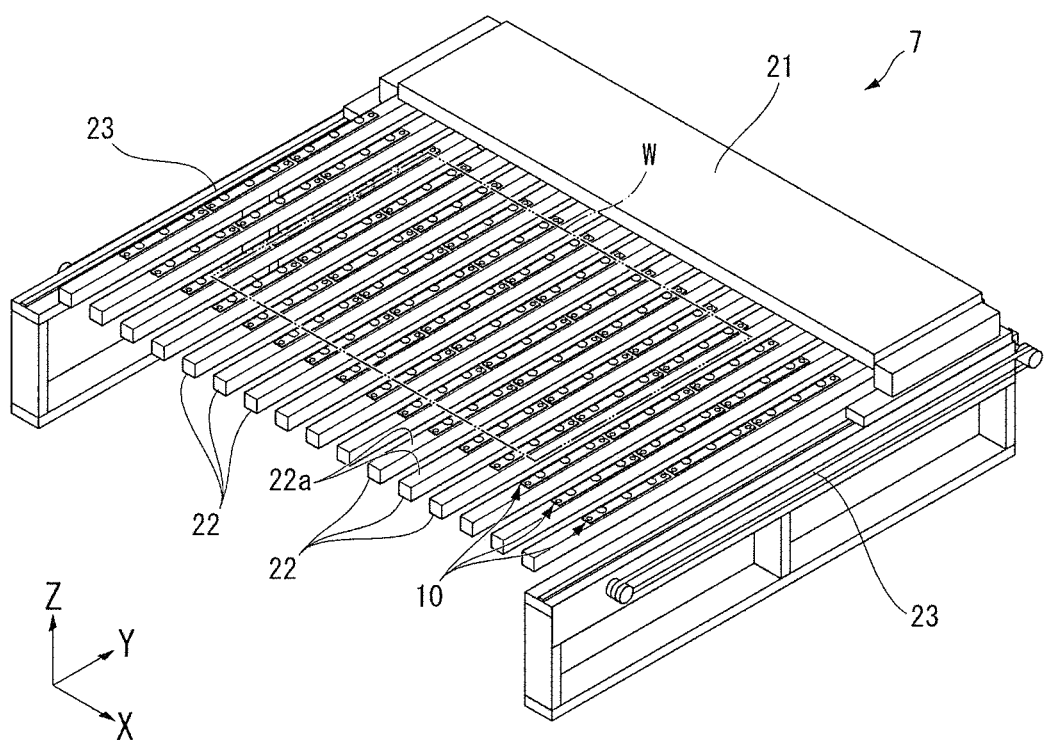
FIG. 3 is a perspective view showing a supporter according to the first example.

FIG. 3 is a perspective view showing the fork apparatus (supporter) according to the first example. The fork apparatus 7 receives the cut workpiece W from the machining palette 5 and supports it. The fork apparatus 7 includes a base 21 and multiple arms 22. The base 21 is in the shape of a plate extending in the X-direction, and the arms 22 are in the shape of rods extending in the negative Y-direction from the base 21. For example, the arms 22 are arranged in the X-direction in a pitch (center-to-center distance) approximately equal to that of the support plates 16 of the machining palette 5 (see FIG. 2). The width of each arm 22 is set to be narrower than the gap between adjacent two support plates 16 of the machining palette 5 and thus each arm 22 can be inserted between adjacent two support plates 16. When the workpiece W is passed, the upper surface 22a of each arm 22 faces the lower surface of the workpiece W. The upper surface 22a of each arm 22 is provided with a suction attacher 10 (also shown in FIGS. 5 and 6). The fork apparatus 7 includes a driver that drives the base 21, and guides 23. The guides 23 are disposed on both sides of the base 21 in the X-direction and extend in the Y-direction. The driver of the fork apparatus 7 moves the base 21 and the arms 22 along the guide 23 in the Y-direction.

FIGS. 4A and 4B include perspective views showing operation of the fork apparatus (supporter) according to the first example. As shown in FIG. 4A, the fork apparatus 7 moves the arms 22 to the negative Y-side toward the machining palette 5 holding the workpiece W in the unloading position P1. The heights of the arms 22 are set in advance to be higher than the upper surface of the base plate 15 of the machining palette 5 and lower than the lower surface of the workpiece W. The arms 22 are moved relative to the support plates of the machining palette 5 in a predetermined direction (Y-direction), inserted between adjacent two support plates 16 of the machining palette 5, and located under the workpiece W.

In the state shown in FIG. 4A, the workpiece W is supported by the support plates 16 of the machining palette 5. As shown in FIG. 4B, in a state in which the arms 22 are located under the workpiece W, the machining palette 5 is moved downward relative to the arms 22, and the workpiece W is passed onto the arms 22. As seen above, the fork apparatus 7 moves vertically relative to the machining palette 5 and receives the workpiece W from the machining palette 5. The arms 22, inserted between the support plates 16 of the machining palette 5, support the lower surface of the workpiece W. The fork apparatus 7 (supporter) may receive the workpiece W from the machining palette 5 by moving the arms 22 upward.

As seen above, the fork apparatus 7 receives the workpiece W from the machining palette 5 in the unloading position P1. If welds are made between the workpiece W and the machining palette 5 by laser machining, the welds are peeled so that the workpiece W can be separated from the machining palette 5 by moving the machining palette 5 downward in a state in which the workpiece W is supported by the arms 22. Also, the fork apparatus 7 are under less laser machining-related constraints than the machining palette 5. Thus, the fork apparatus 7 can be configured to support the workpiece W more stably than the machining palette 5. For example, the arms 22 are able to support the workpiece W at more points or with a larger contact area than the support plates 16 and thus to hold the workpiece W more stably.

Figure 5:
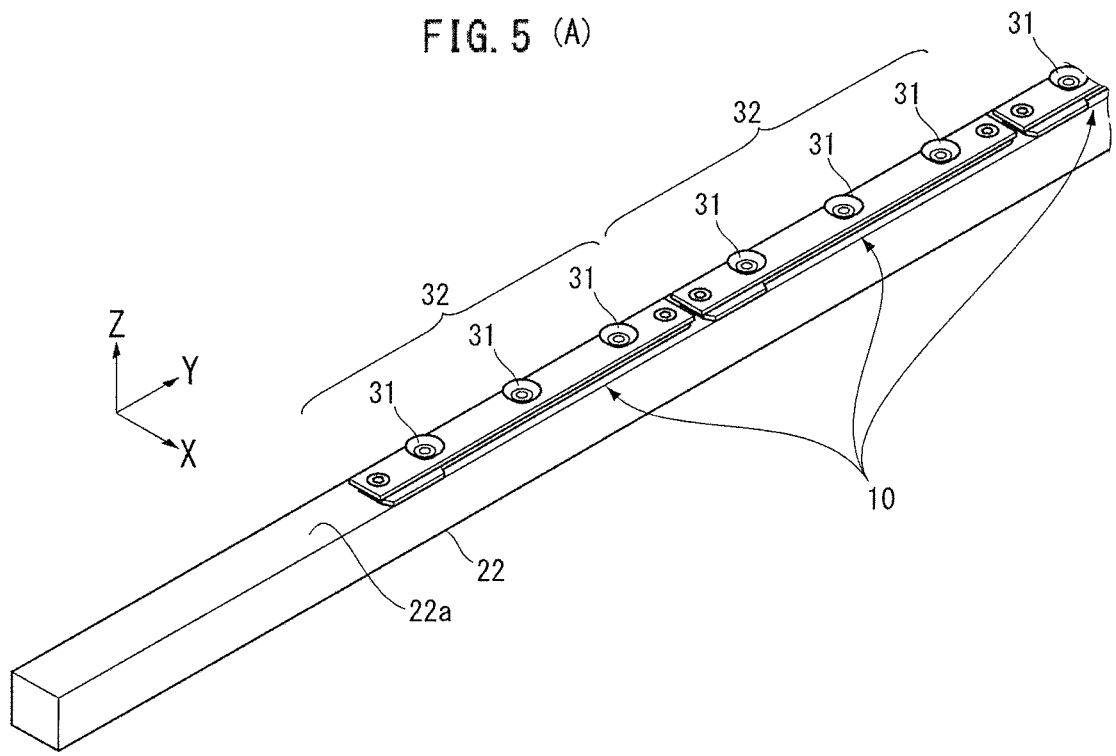
FIGS. 5A and 5B show suction attachers according to the first example.
Figure 5:
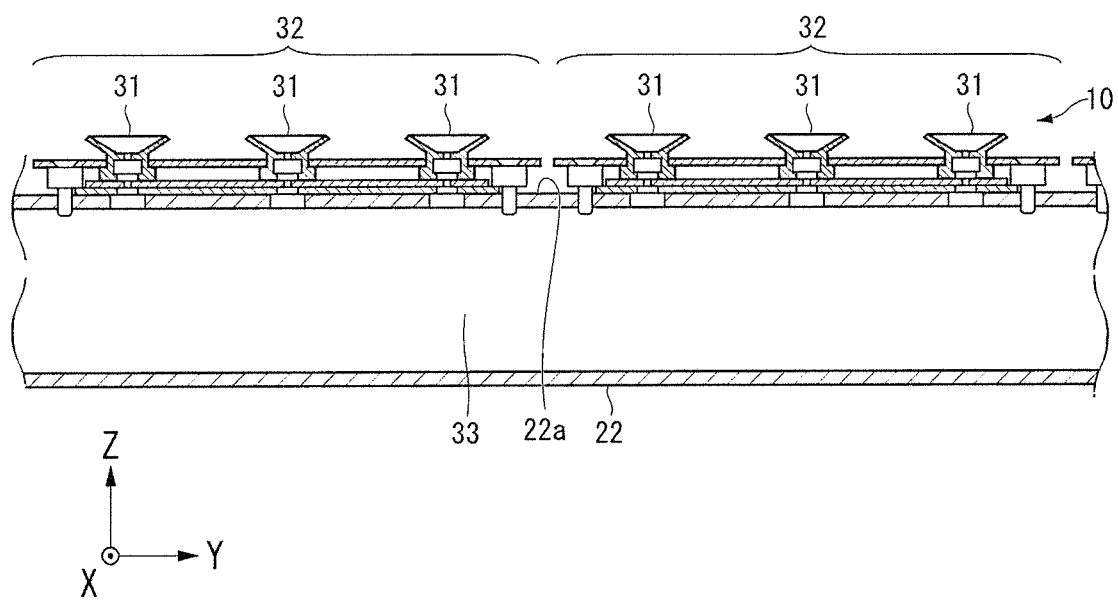
Figure 6:
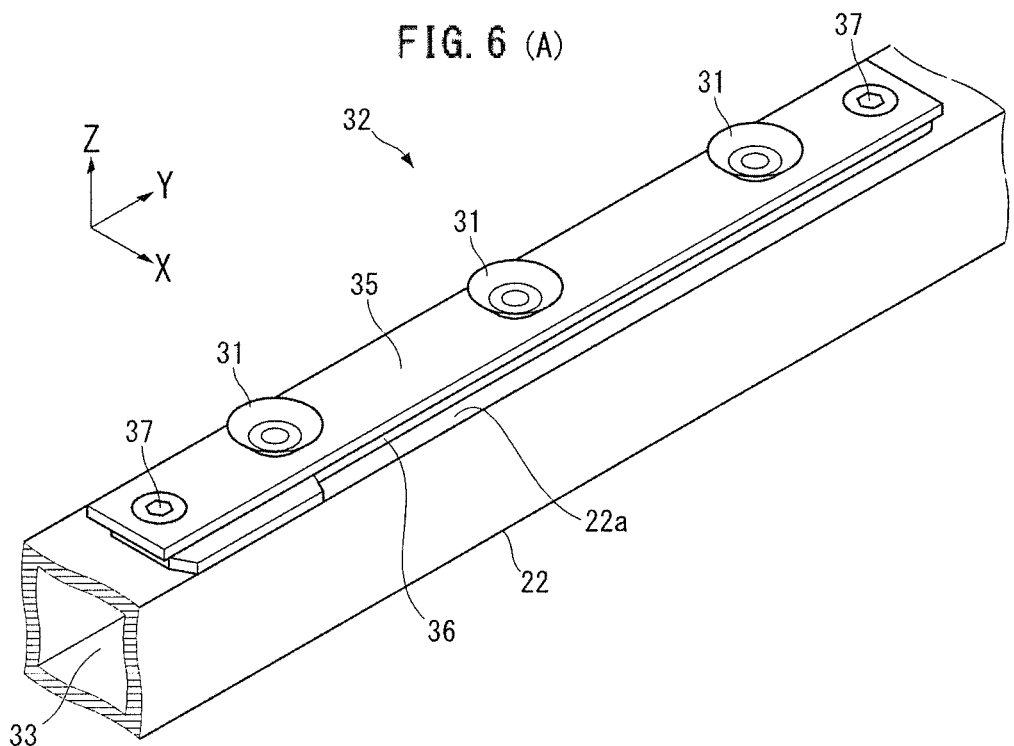
FIGS. 6A-6C show partial enlarged views of a suction attachment unit according to the first example.
Figure 6:
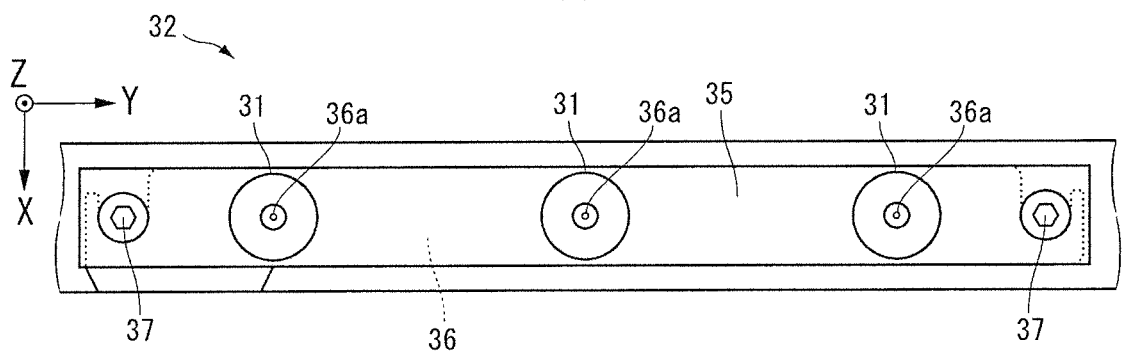
Figure 6:
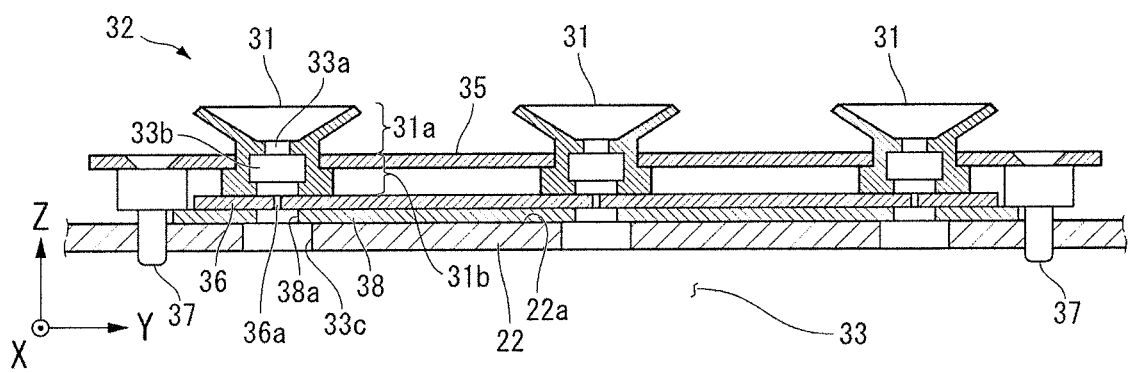

FIGS. 5A and 5B show suction attachers of the first example. The suction attachers 10 are disposed on the arms 22 of the fork apparatus 7. FIG. 5 shows some suction attachers 10 disposed on a single arm 22 as representatives. The suction attachers 10 are disposed on the upper surfaces 22a of the arms 22 facing the workpiece W. The suction attachers 10 attach by suction to at least the products Wa in the workpiece W (see FIG. 4B) supported by the fork apparatus 7. Each suction attacher 10 is provided with multiple suction pads 31 arranged in the length direction (Y-direction) of the corresponding arm 22. A predetermined number of suction pads 31 are collectively mounted on each arm 22. Hereafter, a portion including the predetermined number of suction pads 31 will be referred to as "suction attachment unit 32." An airtight flow path 33 (hollow) is formed in each arm 22, and the corresponding suction pads 31 attach by suction the workpiece W when decompressed through the flow path 33. The flow paths 33 extend in the length direction (Y-direction) of the arms 22 and are connected to a decompressor 34 (shown in FIG. 8).

FIGS. 6A-6C include enlarged views showing a suction attachment unit 32. FIG. 6A shows a perspective view; FIG. 6B shows a plan view seen from above; and FIG. 6C shows a sectional view parallel with a YZ-plane. The suction unit 32 includes suction pads 31, a pressing member 35, a throttling member 36, and fixing members 37.

The suction pads 31 are arranged in the length direction of the corresponding arm 22 at predetermined intervals. The suction pads 31 are formed of, for example, a deformable material such as rubber. As shown in FIG. 6C, an upper portion 31a of each suction pad 31 has a hollow structure including a flow path 33a (hollow). The upper portion 31a has a tapered shape whose upper portions have larger outer and inner diameters. A lower portion 31b of each suction pad 31 has a hollow structure including a flow path 33b (hollow) communicating with the flow path 33a of the corresponding upper portion 31a. The lower portion 31b is approximately cylindrical.

The pressing member 35 is disposed to be shared by the multiple (three in FIG. 6) suction pads 31. The press member 35 fixes the suction pads 31 to the arm 22 by pressing the lower portions 31b of the suction pads 31 against the upper surface 22a of the arm 22. The pressing member 35 has, for example, a rectangular shape whose length direction is the Y-direction, and the positive and negative Y-side ends thereof are fixed to the arm 22 by the fixing members 37 such as screws.

The throttling member 36 and a gasket 38 are disposed between the upper surface 22a of the arm 22 and the suction pads 31. The throttling member 36 and the opening 38 are tabular members. The upper surface of the throttling member 36 is in contact with the lower portions of the suction pads 31, and the gasket 38 is sandwiched between the throttling member 36 and the upper surface 22a of the arm 22. The throttling member 36 and the gasket 38 are pressed down by the pressing member 35 through the lower portions 31b of the suction pads 31 and thus sandwiched and fixed between the upper surface 22a of the arm 22 and the suction pads 31.

The throttling member 36 has through holes 36a (nozzles) corresponding to the suction pads 31. The through holes 36a communicate with the flow paths 33a and the flow paths 33b of the suction pads 31. The opening area of each through hole 36a is smaller than any of the cross-sectional areas of the flow paths 33a, 33b of the corresponding suction pad 31. Thus, the throttling member 36 is able to suppress leakage of air. The gasket 38 has through holes 38a communicating with the through holes 36a of the throttling member 36. The through holes 38a are provided to correspond to the through holes 36a. The opening area of each through hole 38a is greater than the opening area of the corresponding through hole 36a. The arm 22 is provided with multiple through holes 33c connected to the flow path 33 thereof, and the through holes 38a communicate with the through holes 33c of the arm 22. Decompression of the flow paths 33b of the arm 22 causes decompression of the flow paths 33 and flow paths 33a of the suction pads 31 through the through holes 33c of the arm 22, the through holes 38a of the gasket 38, and the through holes 36a of the throttling member 36, producing a negative pressure. Due to this negative pressure, the workpiece W is sucked (attached to by suction) by the suction pads 31. The gasket 38 is used as a sealing member between the arm 22 and the throttling member 36. The configuration of the suction attachers 10 described above is illustrative only and may be changed as needed.

Figure 7:
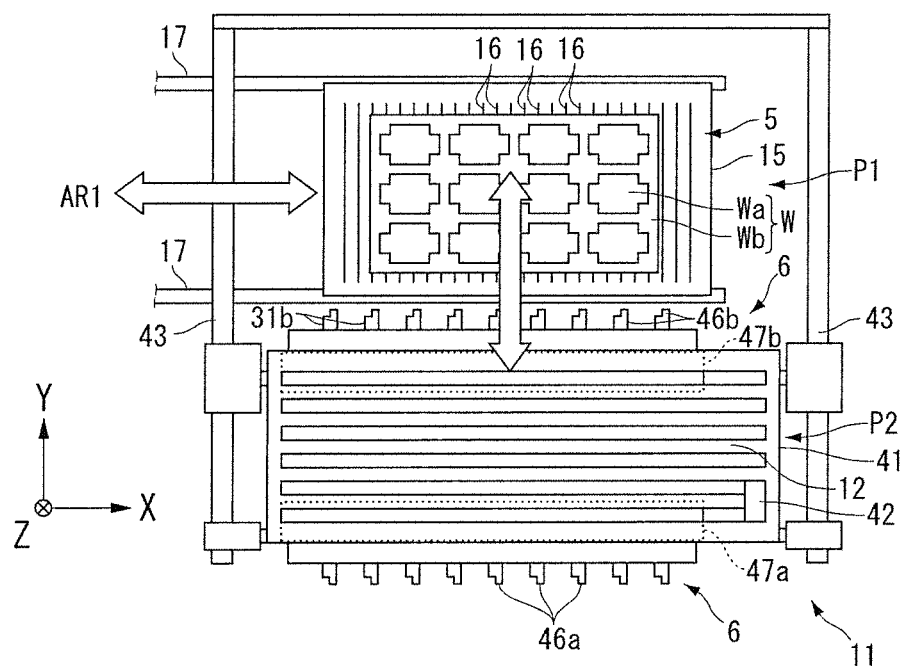
FIGS. 7A and 7B show a gripper according to the first example.
Figure 7:
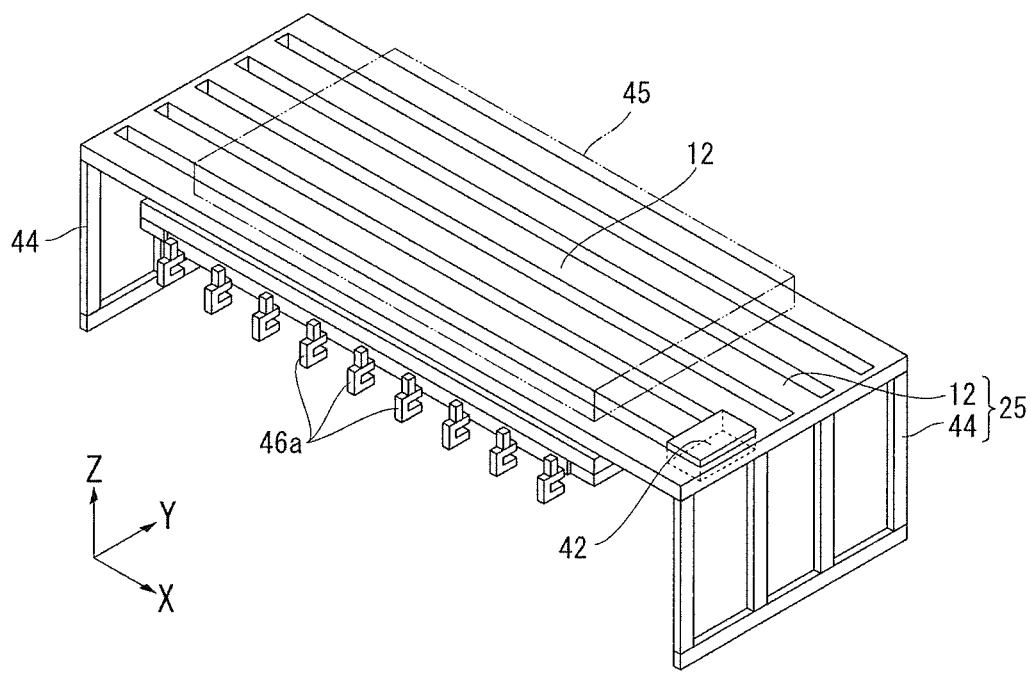

FIGS. 7A and 7B show the gripper according to the first example. The gripper 6 is disposed, for example, on the product palette 11. The product palette 11 includes the gripper 6, a base body 41 (see FIG. 7B), and a driver 42. The base body 41 is disposed to be able to move along rails 43. The rails 43 extend in a direction (e.g., Y-direction) crossing the rails 17 and are disposed on the positive and negative X-sides of the unloading position P1 to sandwich the unloading position P1.

As shown in FIG. 7B, the base body 41 includes vertically extending legs 44 and the product placement unit 12. The legs 44 are disposed on the positive and negative X-sides of the base body 41 to correspond to the pair of rails 43 (see FIG. 7A). The product placement unit 12 has an approximately tabular shape and extends between upper portions of the pair of legs 44 in the form of beams. The product palette 11 is used to temporarily store the products Wa collected from the workpiece W on the product placement unit 12. Placed on the product placement unit 12 is, for example, a transportation member 45 such as a wooden frame for the user to transport products, and the products Wa are collected in the transportation member 45 on the product placement unit 12. The driver 42 is disposed, for example, on the positive X-side of the product placement unit 12. The driver 42 moves the base body 41 along the rails 43. The base body 41 and the driver 42 are able to freely run in an integral manner. The movement direction of the base body 41 (a direction parallel with the rails 43) is a predetermined direction (e.g., Y-direction) crossing the movement direction of the machining palette 5 (a direction parallel with the rails 17).

The gripper 6 removes the remainder Wb from the cut workpiece W including the products Wa and the remainder Wb. For example, the gripper 6 is supported by the base body 41 and moved integrally with the product placement unit 12 of the base body 41. As shown in FIG. 7A, the gripper 6 includes multiple gripping parts (46a, 46b) and drivers (47a, 47b). The gripping parts 46a are arranged on the negative Y-side of the product placement unit 12. The gripping parts 46b are arranged on the positive Y-side of the product placement unit 12. The product placement unit 12 is disposed between the gripping parts 46a and the gripping parts 46b in a predetermined direction (Y-direction).

The sizes and positions of the gripping parts 46a and gripping parts 46b are set such that the gripping parts can be inserted between adjacent two arms 22 of the fork apparatus 7 shown in FIG. 3. A driver 47a is disposed to correspond to the gripping parts 46a and is mounted on the negative Y-side of the lower surface of the product placement unit 12. The driver 47b is able to collectively move the gripping parts 46a in the Z- and Y-directions. The driver 47b is disposed to correspond to the gripping parts 46b and is mounted on the positive Y-side of the lower surface of the product placement unit 12. The driver 47b is able to collectively move the gripping parts 46b in the Z- and Y-directions. The gripper 6 removes the remainder Wb from the products Wa by moving upward while gripping the remainder Wb using the gripping parts 46a and gripping parts 46b. The gripper 6 may be disposed independently of the product palette 11.

Referring back to FIG. 1, the product unloader 8 transfers, from the fork apparatus 7 (supporter), the products Wa separated from the remainder Wb by the gripper 6. The product unloader 8 includes rails 51, a traveling vehicle 52 capable of traveling over the rails 51, and a transfer apparatus 53 disposed on the traveling vehicle 52. The rails 51 extend in a direction (e.g., Y-direction) crossing the transportation direction of the workpiece W (X-direction), that is, the movement direction of the machining palette 5 (X-direction). The traveling vehicle 52 is provided with an X-guide 54 extending in the X-direction, and the transfer apparatus 53 is mounted on the X-guide 54. For example, the transfer apparatus 53 includes an X-moving object 55 that is movable along the X-guide 54, a Z-moving object 56 disposed on the X-moving object 55, and a suction attacher 57 disposed on the lower end of the Z-moving object 56. The Z-moving object 56 is able to move in the up-down direction thereof (Z-direction) while holding the suction attacher 57. The suction attacher 57 is moved in the Y-direction by the traveling vehicle 52, moved in the X-direction by the X-moving object 55, and moved in the Z-direction by the Z-moving object 56. The lower surface (negative Z-side) of the suction attacher 57 is provided with multiple suction pads 58 (shown in FIG. 9C). The suction attacher 57 attaches by suction to a product, for example, by a vacuum or decompression, but may attach to a product by magnetism or the like.

Figure 8:
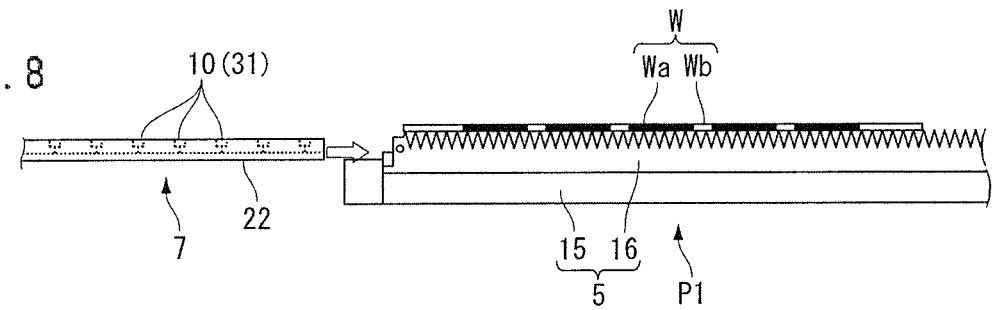
FIGS. 8A-8D show operation of the workpiece transportation system according to the first example.
Figure 8:
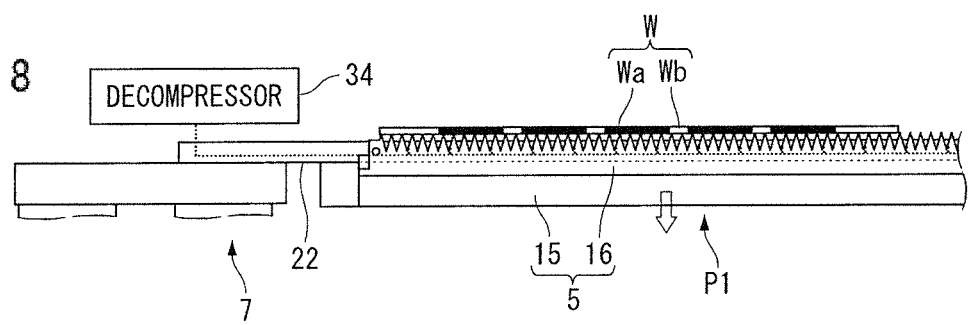
Figure 8:
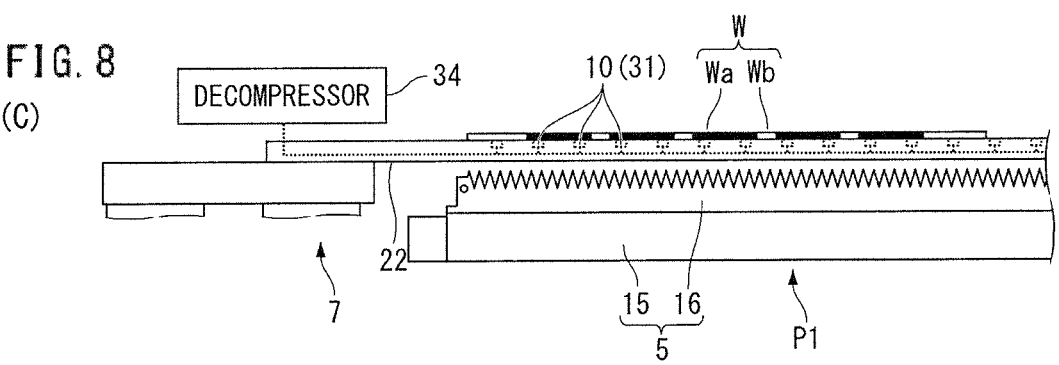
Figure 8:
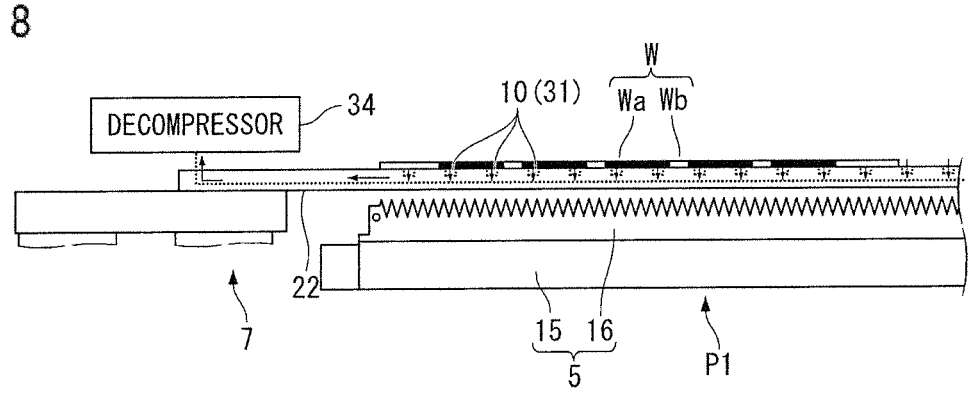
Figure 9:
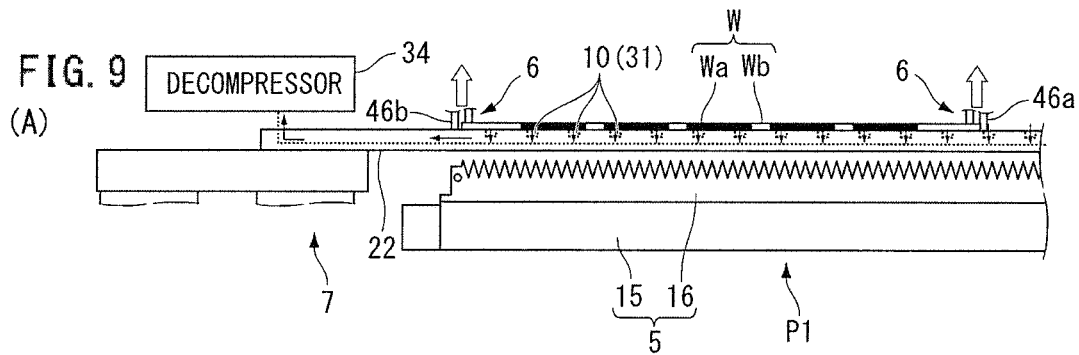
FIGS. 9A-9D show operation of the workpiece transportation system continued from FIG. 8.
Figure 9:
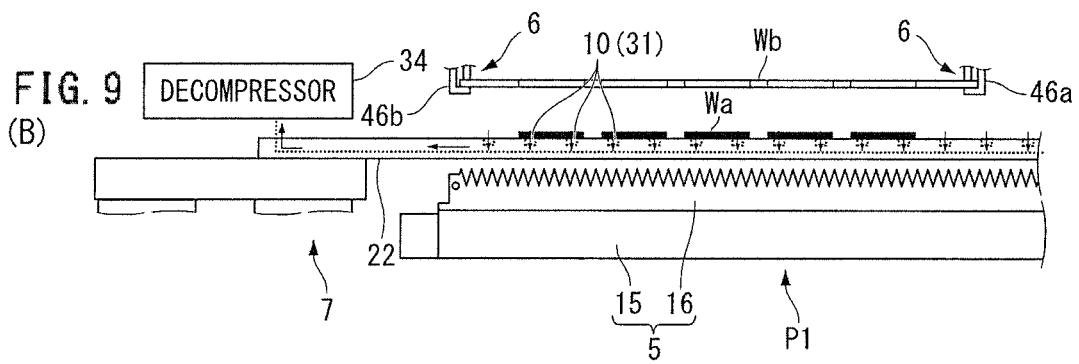
Figure 9:
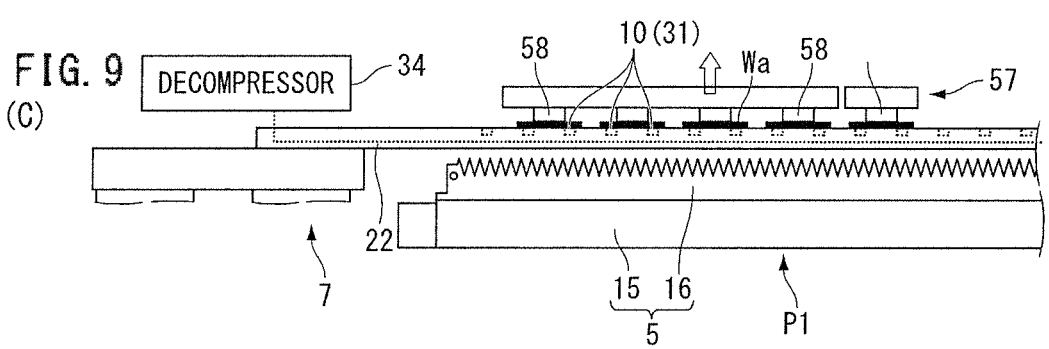
Figure 9:
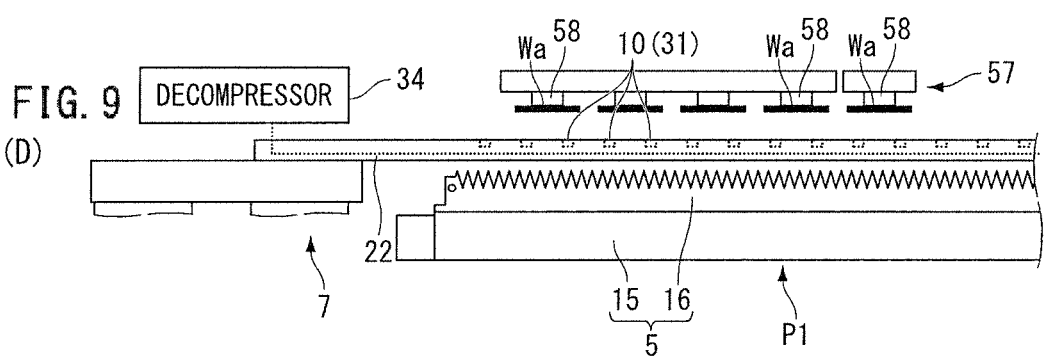

FIGS. 8 and 9 include drawings showing operation of the workpiece transportation system according to the first example. FIG. 8A shows a state in which the machining palette 5 holding a laser-machined workpiece W has been unloaded at the unloading position P1. The fork apparatus 7 moves the arms 22 toward the machining palette 5 and inserts the arms 22 between the support plates 16 of the machining palette 5 under the workpiece W. Then, as shown in FIG. 8B, the machining palette 5 is moved downward relative to the arms 22 of the fork apparatus 7. Thus, as shown in FIG. 8C, the workpiece W is passed to the arms 22. Note that when the workpiece W is passed from the machining palette 5 to the fork apparatus 7 (supporter), the suction attachers 10 may attach to at least the products Wa in the workpiece W. Thus, it is possible to suppress a jump or the like of the workpiece W in reaction to peeling of the welds between the workpiece W and the machining palette 5. Also, the suction attachment to the workpiece W by the suction attachers 10 allows the arms 22 of the fork apparatus 7 to firmly hold the passed workpiece W.

Then, as shown in FIG. 8D, the decompressor 34 decompresses the flow paths 33 by sucking an atmospheric gas (e.g., air) from the flow paths 33 in the arms 22. This decompression produces a negative pressure between the suction pads 31 and the workpiece W, so the suction attachers 10 attach by suction to at least the products Wa in the workpiece W. To cause the suction attachers 10 to attach by suction to only the products Wa among the products Wa and the remainder Wb, for example, slits or through holes serving as flow paths for an atmospheric gas flowing from the outside into the suction pads 31 may be formed in the remainder Wb in advance. Such through holes or slits can be formed using the laser machine 3, or can be formed using a punch press or the like. Also, the positions of the products Wa in the workpiece W may be designed in advance so that the remainder Wb is located to avoid the positions of the suction pads 31. Also, the following configuration may be used: electromagnetic valves or the like are provided on the suction pads 31 in advance; and the multiple suction pads 31 are switched between attachment (ON) and non-attachment (OFF), more specifically, suction pads 31 corresponding to the positions of the products Wa are selectively turned on, and suction pads 31 corresponding to the position of the remainder Wb are selectively turned off. Also, to avoid the position of the remainder Wb, the positions of the suction pads 31 may be determined in accordance with the positions of the products Wa in advance. Also, at least part of the remainder Wb may be attached to by suction by the suction attachers 10.

Then, as shown in FIG. 9A, the gripper 6 is aligned with the workpiece W on the arms 22 of the fork apparatus 7, and the gripping parts 46a and the gripping parts 46b grip the remainder Wb at the ends of the workpiece W. Then, in a state in which the products Wa are attached to by suction by the suction attachers 10, the gripper 6 moves the gripping parts 46a and gripping parts 46b gripping the remainder Wb upward. Thus, as shown in FIG. 9B, the remainder Wb is removed from the products Wa attached to by suction by the suction attachers 10. Since the products W are attached by suction the products Wa can be prevented, for example, from being caught on the remainder Wb and thus lifted thereby. That is, the products Wa and the remainder Wb can be satisfactorily separated. Also, since the products Wa are attached by suction, the removal of the remainder Wb can be prevented from misaligning the products Wa. If at least part of the remainder Wb is attached to by suction by the suction attachers 10, the remainder Wb and the products Wa can be separated from each other by lifting the remainder Wb by a larger force than the suction attachment force of the suction attachers 10.

Then, as shown in FIG. 9C, the product unloader 8 is aligned with the products Wa on the arms 22 of the fork apparatus 7. The suction attacher 57 of the product unloader 8 attaches to the products Wa, and the suction attachers 10 disposed on the fork apparatus 7 release the products Wa. Then, in a state in which the products Wa are attached to by suction by the suction attacher 57, the product unloader 8 moves the suction attacher 57 upward and picks up the products Wa, as shown in FIG. 9D. Alternatively, in a state in which the products Wa are attached to by suction by the suction attacher 57, the product unloader 8 transfers the products Wa by moving the suction attacher 57 to a predetermined transfer destination and causing the suction attacher 57 to release the products Wa. For example, the products Wa are transferred to the transportation member 45 placed on the product placement unit 12 on the product palette 11 shown in FIG. 1.

The product unloader 8 transfers all the products Wa produced from the single workpiece W by one or two or more transfer processes. If two or more types of products are produced from a single workpiece W, for example, the following configuration may be used: multiple product palettes 11 are disposed in advance; and the product unloader 8 sorts products by type and transfers the products to the product palettes 11 by type. Also, if multiple types of products are sorted and transferred, the suction attachers 10 of the fork apparatus 7 may release products Wa to be transferred and absorb products Wa not be transferred.

Figure 10:
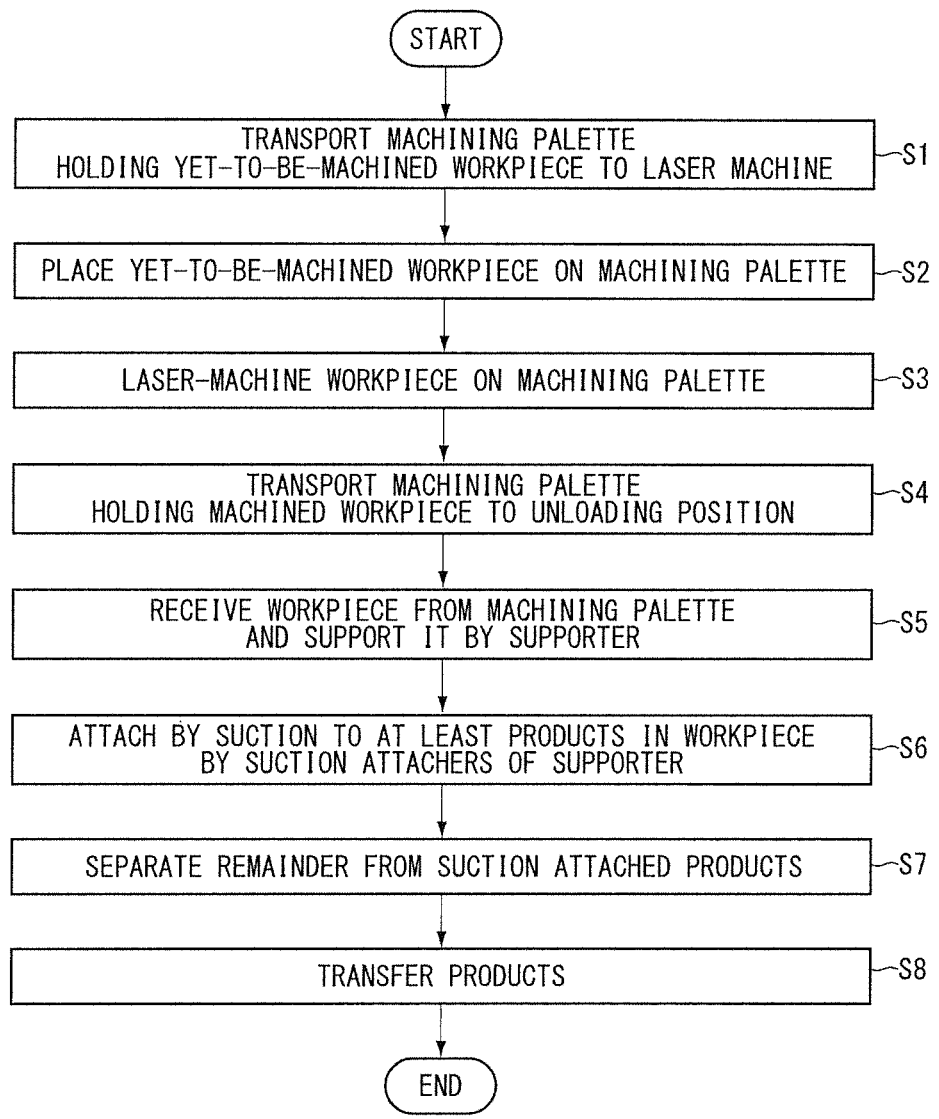
FIG. 10 is a flowchart showing a machining method that uses a workpiece transportation method according to the first example.

Next, a machining method using a workpiece transportation method will be described on the basis of the configuration of the above machining system. FIG. 10 is a flowchart showing the machining method using the workpiece transportation method according to the first example. In step S1, the workpiece supplier 4 places (supplies) a yet-to-be-machined workpiece on the machining palette 5 placed in the loading area AR1. In step S2, the workpiece transportation system 2 transports the machining palette 5 holding the yet-to-be-machined workpiece to the laser machine 3 (see FIG. 1). In step S3, the laser machine 3 laser-machines (cuts) the workpiece W on the machining palette 5. Thus, the workpiece W is cut into products Wa and the remainder Wb (see FIG. 2B).

In step S4, the workpiece transportation system 2 transports the machining palette 5 holding the machined workpiece W from the laser machine 3 to the unloading position P1 (see FIG. 1). In step S5, the fork apparatus 7 (supporter) receives the workpiece W from the machining palette 5 and supports it (see FIG. 4). In step S6, the suction attachers 10 of the fork apparatus 7 attach by suction to at least the products Wa in the workpiece W (see FIG. 8D). In step S7, the gripper 6 separates the remainder Wb from the products Wa attached to by suction by the suction attachers 10. In step S8, the product unloader 8 transfers the products Wa. For example, the product unloader 8 places the products left on the arms 22 of the fork apparatus 7 in the transportation member 45 on the product placement unit 12 on the product palette 11 and collects the products Wa. The workpiece transportation method includes at least steps S4 to S7 of the above steps.

SECOND EXAMPLE

Figure 11A:
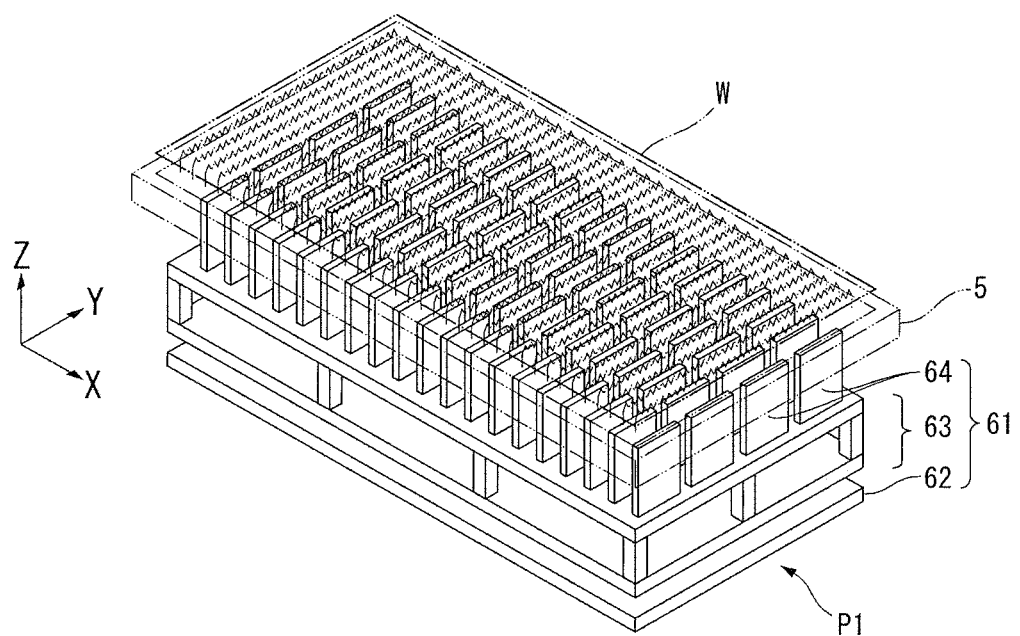
FIGS. 11A and 11B show a supporter according to a second example.
Figure 11B:
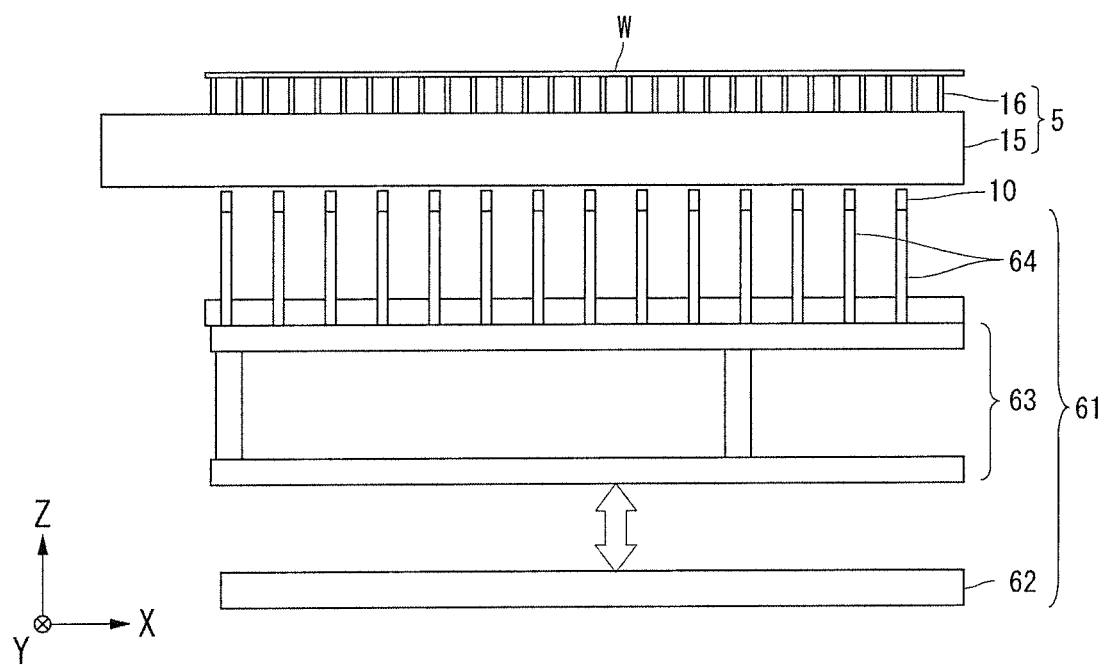

A second example will be described. Elements similar to those of the first example are given the same reference signs, and description thereof is omitted or simplified. FIGS. 11A and 11B show a supporter according to the second example. A supporter 61 (fork unit, lift unit) includes a base 62, a movable plate 63, and multiple arms 64. The base 62 is fixed to an unloading position P1. When the machining palette 5 is unloaded at the unloading position P1, the base 62 is located under a machining palette 5. The movable plate 63 is mounted on the base 62 and can be vertically moved using the base 62 as a supporter. The arms 64 are disposed on the upper surface of the movable plate 63. The arms 64 are two-dimensionally arranged in the X- and Y-directions.

The arms 64 have, for example, tabular shapes and extend vertically upward from the upper surface of the movable plate 63. However, the arms 64 may have shapes other than tabular shapes, for example, columnar shapes. The sizes and positions of the arms 64 are set so that the arms 64 can be inserted between adjacent two support plates 16 of the machining palette 5 (see FIG. 11B). The upper surfaces of the arms 64 can face the workpiece W, and the positions (heights) of the upper surfaces of the arms 64 are aligned with each other. The upper surfaces of the arms 64 are provided with suction attachers 10.

Figure 12:
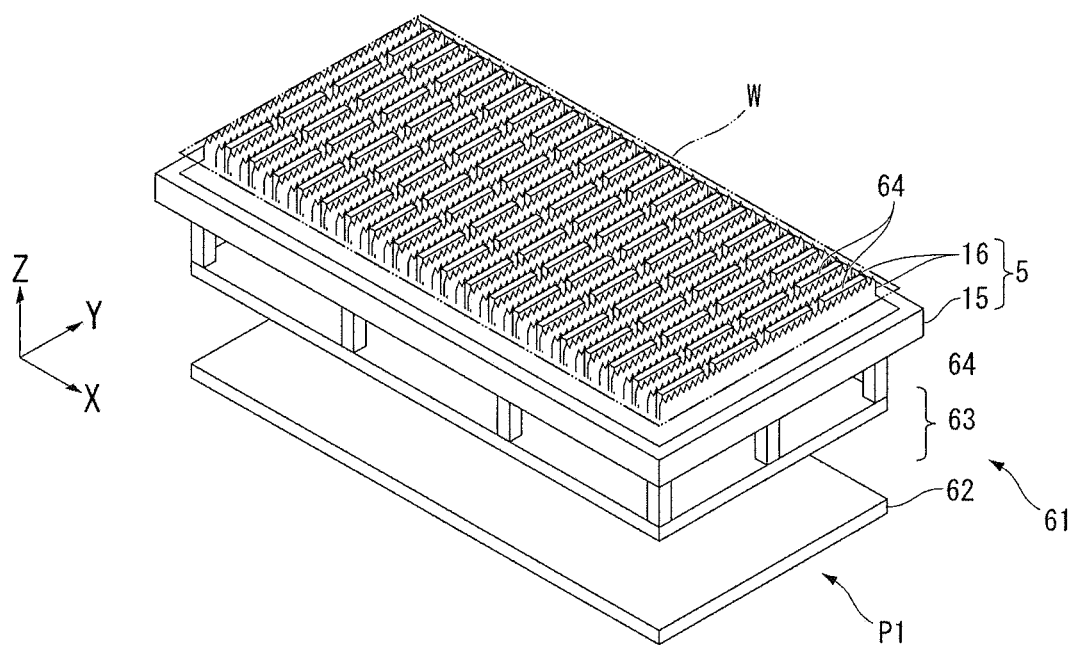
FIGS. 12A and 12B operation of the supporter according to the second example.
Figure 12:
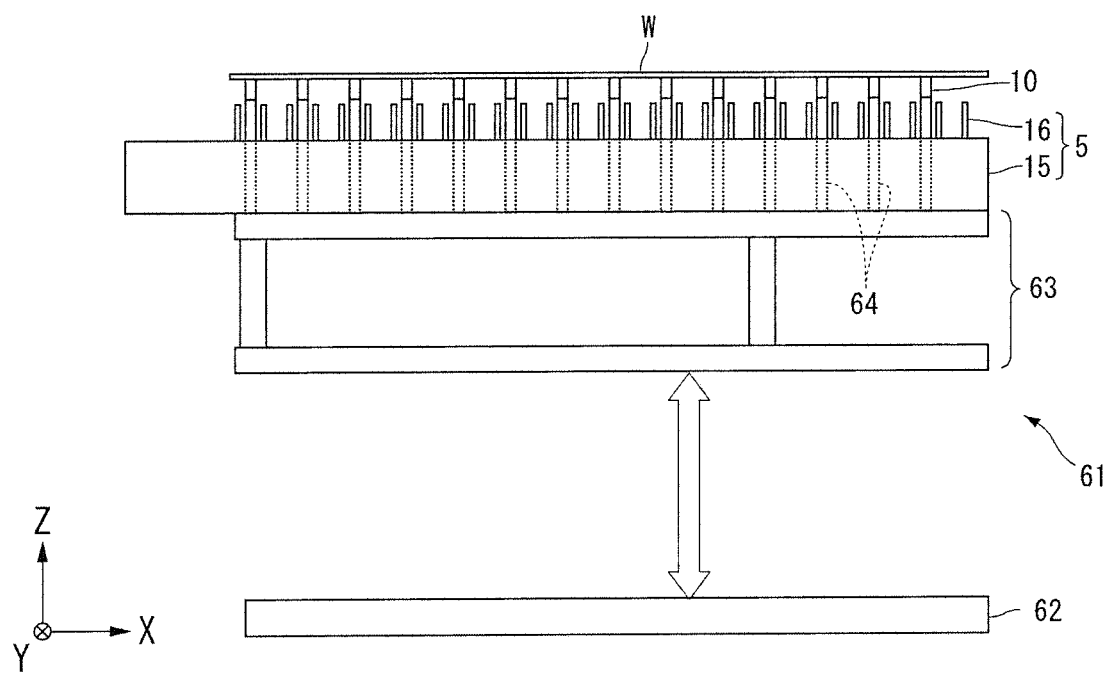

FIGS. 12A and 12B show operation of the supporter according to the second example. In a state in which the machining palette 5 holding the workpiece W is unloaded at the unloading position P1, the supporter 61 moves the movable plate 63 upward using the base 62 as a supporter. The movable plate 63 moves until the upper ends of the arms 22 become higher than the upper ends of support plates 16, and the workpiece W is passed from the machining palette 5 to the arms 64. The installation space (footprint) of the supporter 61 thus configured can be made more compact than that when it is disposed on a side of the unloading position P1. Also, since vertically lower portions of the arms 64 are supported, distortion or the like is reduced compared to when the arms are horizontally supported by a cantilever or the like and thus the workpiece W can be supported stably.

For the supporter 61, the stroke of the arms 64 can be reduced compared to when the arms are inserted between the support plates 16 from a side of the unloading position P1. In a state in which the machining palette 5 is unloaded at the unloading position P1, the products Wa may fall between adjacent support plates 16 of the machining palette 5. In this case, damage caused by the collision between the falling products Wa and the arms 64 can be reduced, since the stroke of the arms 64 can be reduced as described above. The supporter 61 according to the second example need not be provided with the suction attachers 10.

The technical scope of this disclosure is not limited to the aspects described in the examples or the like. One or more of the requirements described in the examples or the like may be omitted. The requirements described in the examples or the like can be combined with each other as necessary. The contents of Japanese Patent Application No. 2015-247091 and all documents cited in this disclosure are incorporated herein by reference as a part of the description.

The invention claimed is:

1. A workpiece transportation system comprising:
   a machining palette that is able to move while holding a cut workpiece including a product and a remainder;
   a supporter that receives the cut workpiece from the machining palette and supports the cut workpiece;
   a suction attacher disposed on the supporter and attaches by suction to at least the product in the cut workpiece supported by the supporter; and
   a gripper configured to separate the remainder from the product while at least the product is attached to by suction to the suction attacher,
   wherein the gripper is configured to remove the remainder from the product by moving upward while gripping the remainder, said moving upward is by a larger force than a suction attachment force of the suction attacher.

2. The workpiece transportation system according to claim 1, wherein the supporter moves upward relative to the machining palette and receives the cut workpiece from the machining palette.

3. The workpiece transportation system according to claim 2, wherein the machining palette comprises a plurality of support plates extending in a predetermined direction parallel to a lower surface of the cut workpiece,
   the support plates support the lower surface of the cut workpiece, and
   the supporter comprises a plurality of arms inserted between the support plates and support the lower surface of the cut workpiece.

4. The workpiece transportation system according to claim 3, wherein the arms of the supporter are moved relative to the support plates of the machining palette in the predetermined direction and inserted between adjacent two support plates of the support plates of the machining palette.

5. The workpiece transportation system according to claim 4, wherein the suction attacher is disposed on surfaces facing the cut workpiece, of the arms.

6. The workpiece transportation system according to claim 3, wherein the arms of the supporter are located under the support plates of the machining palette, moved vertically relative to the support plates, and inserted between the support plates.

7. The workpiece transportation system according to claim 1, wherein a machine cuts the workpiece by applying laser light to a yet-to-be-machined cut workpiece placed on the machining palette.

8. The workpiece transportation system according to claim 1, further comprising a product unloader that transfers, from the supporter, the product separated from the remainder by the gripper.

9. A workpiece transportation method comprising:
- moving, by a machining palette, while holding a cut workpiece including a product and a remainder;
- receiving, by a supporter, the cut workpiece from the machining palette and supporting the cut workpiece;
- attaching by suction, by a suction attacher disposed on the supporter, to at least the product in the cut workpiece supported by the supporter; and
- separating, by a gripper, the remainder from the product while at least the product is attached to by suction to the suction attacher,
- wherein the gripper removes the remainder from the product by moving upward while gripping the remainder, said moving upward is by a larger force than a suction attachment force of the suction attacher.

* * * * *